United States Patent
Gupta

(10) Patent No.: US 11,107,125 B1
(45) Date of Patent: Aug. 31, 2021

(54) USE OF MOBILE DEVICE TO PROVIDE PRODUCT RECOMMENDATIONS FOR AN E-COMMERCE SHOPPING SITE

(71) Applicant: Alphonso Inc., Mountain View, CA (US)

(72) Inventor: Manish Gupta, Bangalore (IN)

(73) Assignee: ALPHONSO INC., Mountain View, CA (US)

( * ) Notice: Subject to any disclaimer, the term of this patent is extended or adjusted under 35 U.S.C. 154(b) by 68 days.

(21) Appl. No.: 15/604,269

(22) Filed: May 24, 2017

(51) Int. Cl.
*G06Q 30/02* (2012.01)
*G06Q 30/06* (2012.01)
*G06F 16/951* (2019.01)

(52) U.S. Cl.
CPC ....... *G06Q 30/0255* (2013.01); *G06F 16/951* (2019.01); *G06Q 30/0251* (2013.01); *G06Q 30/0253* (2013.01); *G06Q 30/0267* (2013.01); *G06Q 30/0631* (2013.01)

(58) Field of Classification Search
CPC ........... G06Q 30/0251; G06Q 30/0255; G06Q 30/0267
See application file for complete search history.

(56) References Cited

U.S. PATENT DOCUMENTS

| | | | | |
|---|---|---|---|---|
| 7,853,664 B1 * | 12/2010 | Wang | ..................... | G06Q 30/06 379/88.01 |
| 9,628,836 B1 | 4/2017 | Kalampoukas et al. | | |
| 2007/0208619 A1 * | 9/2007 | Branam | ................. | G06Q 30/00 705/14.45 |
| 2008/0126198 A1 * | 5/2008 | Ullah | ..................... | G06Q 30/02 705/14.64 |
| 2011/0162002 A1 * | 6/2011 | Jones | ..................... | G06Q 30/02 725/32 |
| 2011/0289114 A1 | 11/2011 | Yu et al. | | |
| 2012/0101898 A1 * | 4/2012 | Kendall | ................. | G06Q 30/02 705/14.52 |
| 2012/0296682 A1 * | 11/2012 | Kumar | ................... | G06Q 10/00 705/7.11 |
| 2013/0019258 A1 * | 1/2013 | Bhatia | .................. | H04N 21/252 725/13 |
| 2013/0071090 A1 * | 3/2013 | Berkowitz | ......... | H04N 21/6547 386/248 |
| 2013/0205318 A1 | 8/2013 | Sinha et al. | | |
| 2013/0325601 A1 * | 12/2013 | Shekhawat | ........ | G06Q 30/0241 705/14.49 |

(Continued)

OTHER PUBLICATIONS

Lee, H. J., & Andrejevic, M. (2013). Second-screen theory: From the democratic surround to the digital enclosure. In J. Holt, & K. Sanson (Eds.), Connected Viewing: Selling, Streaming, and Sharing Media in the Digital Era (1st ed., pp. 40-61). Taylor & Francis. (Year: 2013).*

(Continued)

*Primary Examiner* — Ilana L Spar
*Assistant Examiner* — Jonathan J Whitaker
(74) *Attorney, Agent, or Firm* — Panitch Schwarze Belisario & Nadel LLP

(57) ABSTRACT

Recommendations are made to an e-shopper based on commercials that the e-shopper may have recently viewed on TV or heard on radio. In one preferred embodiment, a cloud-based server collects and stores TV viewership data through mobile devices, using automated content recognition (ACR).

25 Claims, 8 Drawing Sheets

E-shop makes a recommendation made based on TV commercial Viewership

(56) References Cited

U.S. PATENT DOCUMENTS

| | | | | |
|---|---|---|---|---|
| 2013/0332521 A1* | 12/2013 | Olague | ............ | G06Q 50/01 |
| | | | | 709/204 |
| 2014/0244447 A1* | 8/2014 | Kim | ............ | G06Q 30/0254 |
| | | | | 705/27.2 |
| 2014/0282655 A1* | 9/2014 | Roberts | ............ | G06Q 30/0255 |
| | | | | 725/14 |
| 2015/0163345 A1* | 6/2015 | Cornaby | ............ | G06F 3/04847 |
| | | | | 345/633 |
| 2015/0181268 A1* | 6/2015 | Navin | ............ | H04N 21/2668 |
| | | | | 725/18 |
| 2015/0370814 A1 | 12/2015 | Liodden et al. | | |
| 2016/0092930 A1* | 3/2016 | Chang | ............ | G06Q 30/0269 |
| | | | | 705/14.66 |
| 2018/0032997 A1* | 2/2018 | Gordon | ............ | G06Q 20/3224 |

OTHER PUBLICATIONS

Wikipedia entry for "Automatic Content Recognition." downloaded from web page: https://en.wikipedia.org/w/index.php?title=Automatic_content_recognition&printable=yes, download date: Aug. 11, 2016, 4 pages.

Audible Magic® product brochures: Core Technology & Services Overview, Broadcast Monitoring, and Media Identification, Audible Magic Corporation, Los Gatos, California, downloaded from web pages at http://www.audiblemagic.com, download date: Aug. 11, 2016, 11 pages.

Gracenote Entourage™, Gracenote, Inc., Emeryville, California, downloaded from webpage: http://www.gracenote.com/video/media-recognition-and-insights/, download date: Aug. 24, 2016, 5 pages.

\* cited by examiner portion of persistent database 22

| Device ID | Commercial ID | Product | Brand | Product Category | Product Type | Viewing Date/Time |
|---|---|---|---|---|---|---|
| Device-A | C1 | P1 | B1 | PC1 | PT1 | DT1 |
| Device-B | C2 | P2 | B2 | PC2 | PT2 | DT2 |
| Device-A | C3 | P3 | B3 | PC3 | PT3 | DT3 |
| Device-A | C4 | P4 | B4 | PC4 | PT4 | DT4 |
| Device-C | C5 | P5 | B5 | PC5 | PT5 | DT5 |
| ... | ... | ... | ... | ... | ... | ... |

Figure 2 device graph 56

| Device ID | Associated device ID's | User credentials | IP addresses accessed by device ID | Other identity information |
|---|---|---|---|---|
| 99000228659380 | 99000228654821 9900034572045933 | e-shop user ID = johnsmith44 | 76.240.249.145 | 421 Main Street, Middletown, PA |
| ... | ... | ... | ... | ... |

Figure 8

USE OF MOBILE DEVICE TO PROVIDE PRODUCT RECOMMENDATIONS FOR AN E-COMMERCE SHOPPING SITE

BACKGROUND OF THE INVENTION

E-sellers such as Amazon® and Flipkart™ make product recommendations to its user based on products which the user might have viewed recently on their website. For example, once logged in, Amazon displays product recommendations in a section labeled "Related to items you've viewed." These items are similar products in different sizes, brands, and the like, to products that the logged-in user looked at in the past. It is also common practice when browsing the internet for websites to use cookies and other tracking technology to present product recommendations in the form of advertisements based on search requests entered into a search engine such as GOOGLE® and/or websites that the user navigates to.

These types of product recommendations are narrow in scope and simply mimic back items and/or related items or services that a user may already be actively seeking. The technology for creating such product recommendations misses opportunities to present recommendations that may still be relevant to the user, but cannot be captured based solely on active user inputs, such as search requests, previously viewed products, and browsing history. Accordingly, there is a need for new approaches to broaden the pool of potential product recommendations. The present invention fulfills such a need.

SUMMARY OF THE PRESENT INVENTION

Recommendations are made to an e-shopper based on commercials that the e-shopper may have recently viewed on TV or heard on radio. In one preferred embodiment, a cloud-based server collects and stores TV viewership data through mobile devices, using automated content recognition (ACR).

BRIEF DESCRIPTION OF THE DRAWINGS

Preferred embodiments of the present invention will now be described by way of example with reference to the accompanying drawings:

FIG. 2 shows a database for use in the system of FIG. 1.

FIG. 8 is sample device graph data for use in preferred embodiments of the present invention.

DETAILED DESCRIPTION OF THE INVENTION

Figure 1:
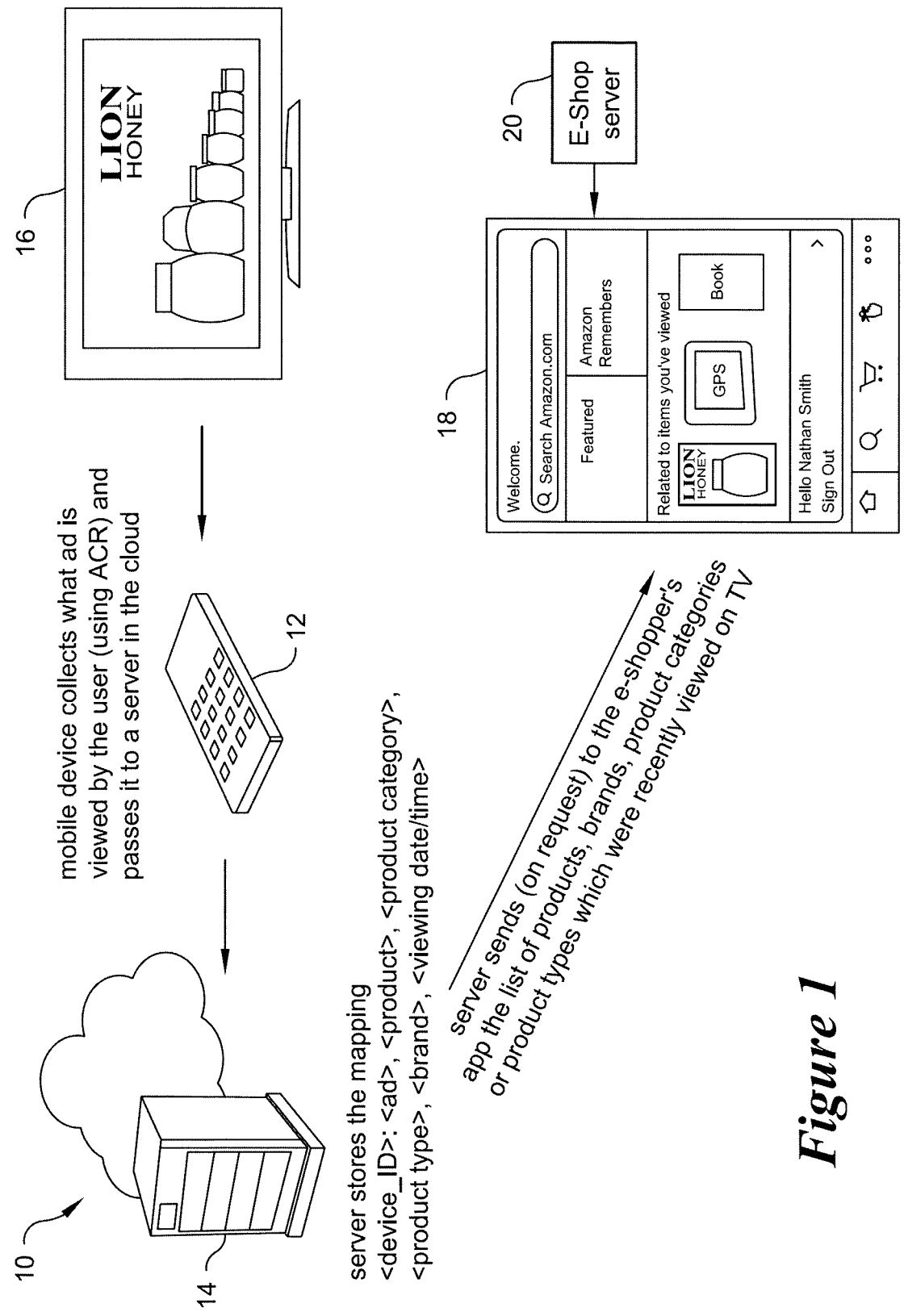
FIG. 1 shows a system overview of one preferred embodiment of the present invention.

Certain terminology is used herein for convenience only and is not to be taken as a limitation on the present invention.

The words "a" and "an", as used in the claims and in the corresponding portions of the specification, mean "at least one."

I. Definitions

The following definitions are provided to promote understanding of the present invention.

electronic commerce (e-commerce) shopping—also, referred to as "e-shopping," "e-tailing," or "e-selling," which are shortened forms of "electronic shopping," "electronic retail," and "electronic selling," respectively. An online store may also be called an e-web-store, e-shop, e-store, Internet shop, web-shop, web-store, online store, online storefront and virtual store. Mobile commerce (or m-commerce) refers to purchasing from an online retailer via a software application (app) of a mobile device or a browser of the mobile device.

audio content—audio content includes (i) an audio portion of a conventional broadcast TV signal, typically delivered over a cable or fiber optic network via a set top box, CableCARD® or the like to a TV; (ii) an audio portion of an over-the-air (OTA) or "aired" broadcast TV signal; (iii) an audio portion of streaming services that deliver video content to a TV device that is connected to a viewer's home network; (iv) any type of audio streaming that occurs during an internet-based session; (v) a conventional broadcast audio signal, such as AM/FM or satellite radio; and (vi) "on-demand" delivery of any of the above audio content. Audio content may also be referred to as a "stream of audio data."

commercial (also, referred to interchangeably as an "advertisement" or "ad")—A "commercial" is an advertisement for a product or service, and also includes advertising for program type content, known in the TV industry as a "promo." A commercial is thus distinguishable from "program type content." An example of "program type content" is a TV show.

commercial break (also, referred to interchangeably as a "block of commercial content," "commercial block," "ad block," or "ad pod")—Each commercial break includes a plurality of successive individual commercials. That is, the commercials are aired back-to-back in a set or group. Commercial breaks are interspersed during a TV program. The total length of the commercial breaks aired during a TV show is almost always significantly shorter than the length of the TV show. Likewise, the length of one commercial break is almost always significantly shorter than the lengths of the TV show segments that precede and follow the commercial break. A typical broadcast TV channel airs about 20 minutes of commercial content per hour. One common format for a commercial break is to show national advertisements first, followed by regional/local advertisements, and concluding with promos.

IP address—unique identifier of a computer network (e.g., 76.240.249.145). Multiple devices that are on the same network will typically share the same unique IP address.

device identifier (device ID)—a device ID is equivalent to a "MAC address" or "physical address" which is unique for every device. The device may be a mobile device, smart TV or the like. A device ID is typically fixed, but in the case of mobile devices, their device ID's are now user-resettable. A sample device ID (ESN/IMEI/MEID) for an Iphone® 5 is: 990002286593860.

II. Detailed Disclosure

A. System Overview

FIG. 1 shows a system overview of one preferred embodiment of the present invention. System 10 includes a plurality of mobile devices 12 (only one mobile device 12 is shown in FIG. 1), remote server 14, a plurality of audio-visual devices 16, such as TV's (only one TV is shown in FIG. 1), an e-shop output display screen 18, and an e-shop server 20. At a high level, the system 10 operates as follows:

1. The mobile device 12 collects audio data in its vicinity, picking up any audio data from the neighboring audio-visual device 16 (here, a TV).

2. The mobile device 12 and the remote server 14 work together to perform ACR on the audio data so as to identify commercials in the audio data. As discussed in more detail below, the specific roles played by each of the devices in the ACR process depends upon the design configuration. In one instance, the mobile device 12 simply streams all of the collected audio data to the remote server 14 which performs all of the data processing that is necessary to identify the commercials. In another instance, some pre-processing is performed in the mobile device 12, such as identifying and snipping out only the audio content that is likely to be commercials, and sending only that audio content to the remote server 14 to perform the commercial identification portion of the ACR process.

3. The remote server 14 stores a mapping of device ID, ad, product, brand, and viewing date/time (timestamp), as shown in FIG. 2. The mapping may also include product category and product type.

4. The remote server 14 sends (on request) to the e-shopper's app the list of products and brands which were recently viewed on the TV.

5. The e-shop then makes a recommendation based on the TV commercial viewership.

6. When the user launches or uses the e-shopper's app on the mobile device 12, the recommendations appear on a display screen delivered to the user within the app.

The recommendations made in this manner fundamentally differ from the conventional recommendation process that depends upon previously entered user information (e.g., search requests, browser/website requests), because the commercials aired on the TV were not selected by the viewer, but rather simply appeared based on scheduling completely out of the control of the viewer. While this difference may lead one to conclude that the recommendations that appear when using the e-shop app are not likely to be relevant to the user, there are numerous reasons why this alternative approach of formulating recommendations is commercially useful.

For example, this process provides advertisers with potentially valuable ad campaign reinforcement (also, referred to as "retargeting" or "aided or assisted product or brand recall"), thereby enhancing an aired commercial for a product with an additional product impression made on the e-shop. Also, the demographics of the audience for the particular TV show or TV channel that was watched by the viewer may correlate strongly with viewer characteristics. Since commercials are often selected for a TV show or TV channel based on the viewer's demographics, the product in the commercial may be highly relevant to the viewer, in which case the product recommendation would be equally relevant.

Furthermore, this process may be used for measuring ad campaign impact and/or marketing attribution. By measuring the number of clicks made on a recommendation against benchmarks, metrics regarding the effectiveness of the originally aired or streamed commercial and the effectiveness of retargeting may be calculated. Similarly, if a click on a recommendation results in a completed purchase from the e-shop, attribution may be tracked and recorded, which may result in monetary payments being made to a third party entity if such an agreement exists.

FIG. 1 shows the audio-visual device 16 as being a TV. However, the audio-visual device 16 may alternatively be an audio-only device, such as a radio. Furthermore, as discussed in more detail below, the mobile device 12 may only be used for audio capturing, and the e-shop may be accessed via a completely different device, such as a desktop computer or a different mobile device. This embodiment requires the use of a device graph, as also discussed below.

B. Data Elements

For the embodiment of FIG. 1, the following data is collected and used:

1. device_id: the device through which viewership data was collected.

2. commercial: which commercial was viewed with the device in the proximity of the television (or radio).

3. product: product which is advertised by the commercial.

4. brand: brand associated with the product.

5. date & time (timestamp): date and time when the commercial was viewed with the device in the proximity of the television (or radio).

For wider targeting, the following additional data may be used:

6. product_type: e.g., car, shoes, insurance 7. product category: e.g., fashion, electronics At some point in future, when the e-seller's app on the mobile device 12 is run, the app connects with the remote server 14, and requests to share a list of products which have been recently viewed by the user on the TV 16 (or radio) through the mobile device 12. The definition of "recently" is app-specific. It can be within a day, within a week or longer.

The remote server 14 responds with a list of {product, brand} to the app, which the app can use to make a product recommendation to the user, as shown in FIG. 1. The app can make a recommendation for the same product/brand or may make a recommendation for a different product/brand for the same product type and/or in the same product category.

C. Implementation Example

The following steps describe one implementation example.

STEP 1: The mobile device 12 captures audio content and sends it to the remote server 14 which identifies the content (commercial(s)) and stores the information {device-id, the content (commercial ID), product, affiliated brand, viewing date/time, product type, and product category} in persistent database 22 shown in FIG. 2. (Only a representative portion of the persistent database 22 is shown in FIG. 2.)

In FIG. 2, Device-A's user has recently watched 3 commercials {C1, C3, and C4} for three products {P1, P3, and P4} and brands {B1, B3, B4} respectively.

STEP 2: At some point in future, the user of the mobile device 12 accesses an e-seller app on the same mobile device 12. At this point, the e-seller app on the mobile device 12 may contact the remote server 14, requesting a list of commercials which were recently watched (with the mobile device 12 nearby). The remote server 14 responds with a list carrying zero or more commercials (along with product, brand, product category, product type) back to the e-seller's app. The e-seller's app working in conjunction with the e-seller's server (e-shop server 20) uses the list to make a recommendation to the buyer.

Figure 3:
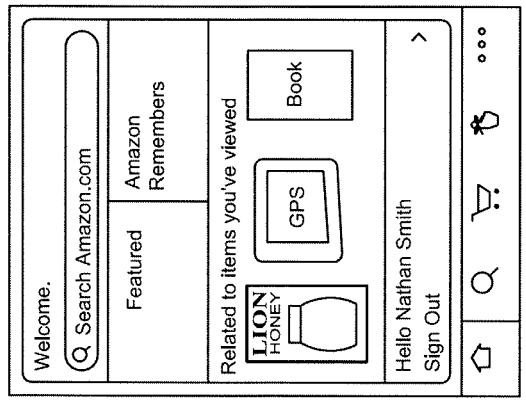
FIG. 3 shows a data flow diagram for the system of FIG. 1.
Figure 3:
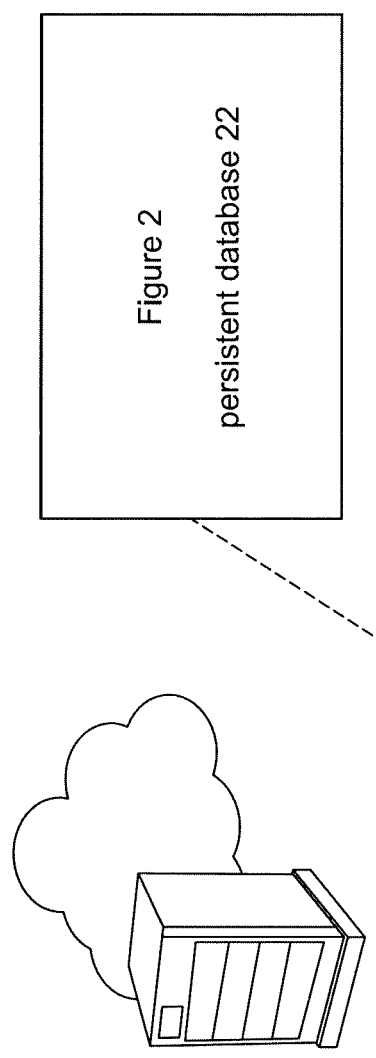

In FIG. 3, the Device-A was supplied a list of 3 products {P1, P3, and P4} along with respective brands by the remote server 14. The Device-A ended up recommending product/ brand {P1, B1} to the prospective e-shopper.

D. Hardware/Software Implementation

Figure 4:
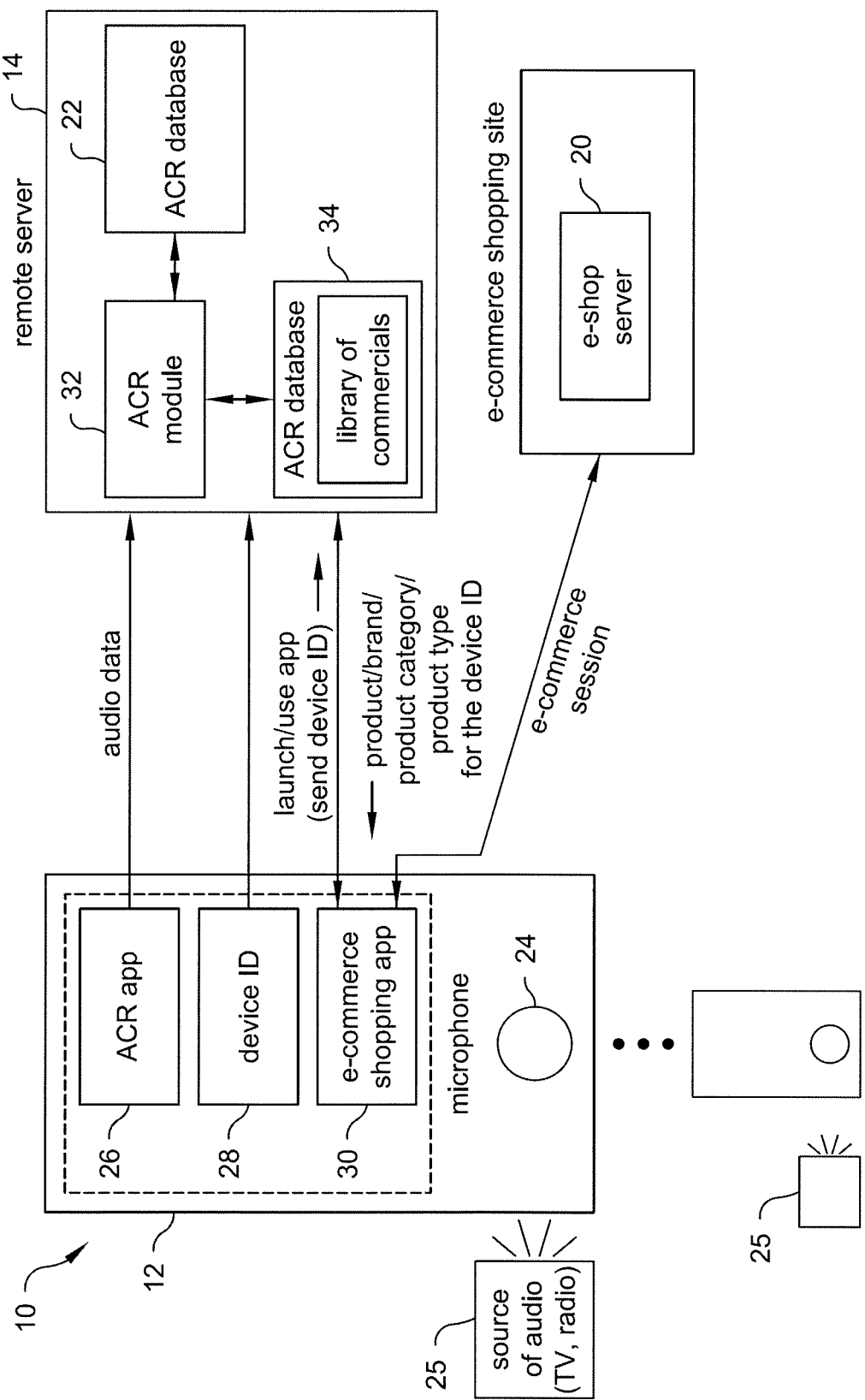
FIG. 4 shows detailed components of the system of FIG. 1.

FIG. 4 shows an expanded view of one preferred embodiment of the hardware/software components of the mobile device 12 and the remote server 14 of the system 10 in FIG. 1 wherein the same mobile device is used for capturing media content and for e-commerce shopping. In a functional system, there are a plurality of mobile devices 12, each having a unique device ID, as is known in the art. Each mobile device 12 includes a microphone 24 for capturing ambient audio content from a nearby source of audio 25. Software elements are shown within the dashed lines and include an ACR app 26 (also referred to herein as a "first application"), a unique device ID 28, and an e-commerce shopping app 30 (also referred to herein as a "second application") that communicates with the e-commerce shopping site's e-shop server 20 during an e-commerce session. The remote server 14 includes an ACR module 32, an ACR database 34 that includes a library of known commercials, and the database 22 shown in FIG. 2. The e-commerce shopping site includes the e-shop server 20, also shown in FIG. 1.

As is well-known in the art, the ACR module 32 evaluates a succession of audio samples of a commercial against a database of audio files (library of commercials) in the ACR database 34. In one preferred embodiment, representations of the audio samples are created in the form of segment representations. In one preferred embodiment, each representation is a digital signature of the segment, such as a segment fingerprint. However, other types of representations are within the scope of the present invention. When using segment fingerprints, the ACR database 34 stores segment fingerprints of the commercials in the library, and the ACR module 32 performs fingerprint comparisons to identify any commercials in the succession of audio samples, as is well-known in the art. See, for example, U.S. Pat. No. 9,628,836 (Kalampoukas et al.), which is incorporated herein by reference.

As discussed above, the ACR functions of the mobile device 12 compared to the ACR functions of the ACR module 32 may be very limited or very extensive, depending upon the system implementation. ACR is typically a very data and processor-intensive function which generally limits the ability of the mobile device 12 from performing all of the necessary ACR functions. However, if all of the functionality is performed only in the remote server 14, then the mobile device 12 must stream all of the received audio data to the remote server 14, thereby significantly increasing its communication load. Thus, in one preferred embodiment, the ACR app is provided with sufficient intelligence and processing resources to detect likely commercial segments (e.g., a commercial break), and to snip out and communicate only the audio data of the likely commercial segments to the remote server 14, which can then perform the commercial detection. However, in other implementations, some of the ACR functions that are typically performed by the ACR module 32 in the remote server 14 are instead performed in the ACR app 26 of the mobile device 12. Likewise, if communication load between the mobile device 12 and the remote server 14 is not a constraint and minimal processing is desired in the ACR app 26, an alternative embodiment may involve streaming or otherwise communicating all of the audio data received by the mobile device 12 (via the microphone 24 and the ACR app 26) to the remote server 14, and allowing the ACR module 32 to perform all remaining ACR functions, including the initial detection of likely commercial segments within the audio data.

The ACR app 26 may be any app that captures audio through a microphone and communicates with the remote server 14. Preferably, the ACR app also generates audio fingerprints from the captured audio, wherein only the audio fingerprints, and not the full audio data captured by the microphone, is communicated to the remote server 14. However, as discussed above, the scope of the present invention includes an embodiment wherein all of the audio data captured by the microphone is communicated to the remote server 14 for audio fingerprint generation and performance of the remaining ACR functions.

In one preferred embodiment, the ACR app 26 may be viewed as a "capture app" in the sense that its primary purpose is to capture the ambient audio content. The functionality of the ACR app 26 is preferably provided in a Software Development Kit (SDK). In this manner, the SDK may be integrated with other mobile apps, which may not be developed or published by the entity that provides the SDK.

Figure 5:
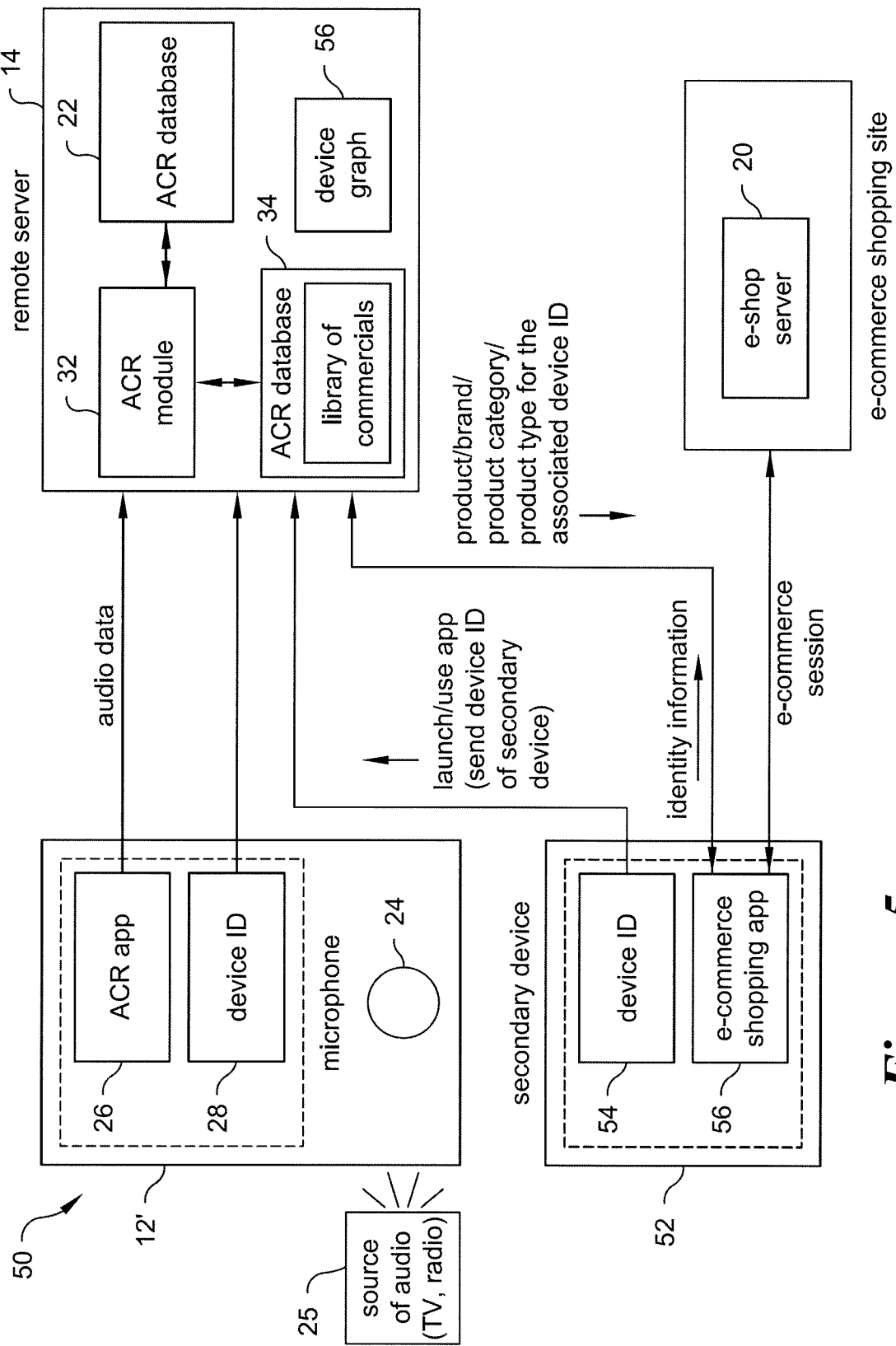
FIG. 5 shows detailed components of an alternative embodiment of the present invention.

FIG. 5 shows an alternative embodiment (system 50) of the system 10 in FIGS. 1 and 4 wherein the mobile device used for capturing media content is not the same device used for e-commerce shopping. FIG. 5 differs from FIG. 4 in the following ways:

1. The user of the mobile device 12' uses a secondary device 52 for e-commerce shopping instead of using the same device for both functions. The secondary device 52 may be a second mobile device (e.g., the mobile device 12' may be a smartphone and the secondary device may be a tablet computer, such as an iPad®), or the secondary device 52 may be a desktop computer or a computer device having any other suitable form factor that allows for e-commerce shopping. The secondary device 52 includes its own unique device ID 54 and an e-commerce shopping app 56 which is similar to the e-commerce shopping app 30 in the mobile device 12. As shown in FIG. 5, the secondary device 52 performs the same communications with the remote server 14 and the e-commerce shopping site as performed by the e-commerce shopping app 30 in the mobile device 12.

2. The e-commerce shopping app 30 is not necessarily installed on the mobile device 12'. However, the mobile device 12' may also include the e-commerce shopping app 30 (not shown in FIG. 5) so that the user may perform e-shopping using either the same mobile device 12' or the secondary device 52, depending upon convenience and availability.

3. The remote server 14 includes a device graph 56 that includes data for correlating/matching unique device identifiers to other identity information associated with the same entity as the entity of a respective unique device identifier. No device graph is required in the embodiment of FIGS. 1 and 4 because the same unique device ID of the mobile device 12 is communicated to the remote server 14 from both the ACR app 26 and the shopping app 30. The device graph 56 is described in further detail below.

For ease of illustration, FIG. 5 shows only one mobile device 12' and one secondary device 52. However, in a fully functional system, there are a plurality of mobile devices 12' and a plurality of secondary devices 52.

E. Example Details

Figure 6:
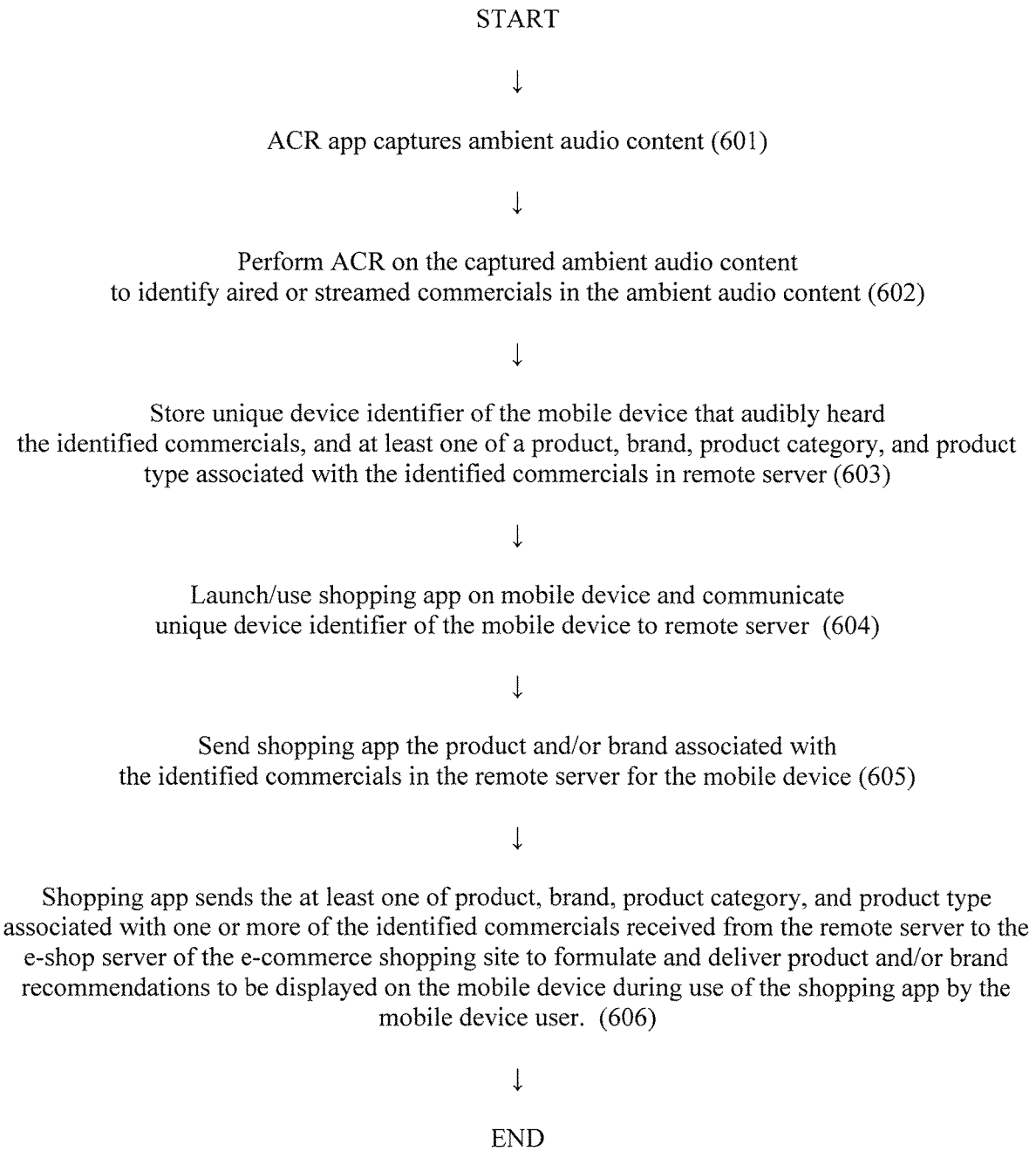
FIG. 6 is a flowchart of the operation of the system of FIG. 4 in accordance with one preferred embodiment of the present invention.

FIG. 6 shows a flowchart of the steps performed by the elements of FIG. 4 in one preferred embodiment wherein the same mobile device is used for capturing media content and for e-commerce shopping. The steps are described in the context of only one of the mobile devices 12. However, in a functional system, a plurality of mobile devices 12 concurrently perform these steps.

1. The ACR app 26 in conjunction with the microphone 24 of the mobile device 12 captures ambient audio content, such as from the source of audio 25. The captured ambient audio content includes audio content of media content that is aired or streamed to multiple users. (Step 601)

2. ACR is performed on the captured ambient audio content to identify aired or streamed commercials in the ambient audio content. The ACR app 26 and the remote server 14 communicate with each other to perform the ACR. The communication includes sending the unique ID 28 of the mobile device 12 to the remote server 14. The unique device ID 28 is retrieved from memory of the mobile device 12. (Step 602)

3. For each identified commercial, the database 22 of the remote server 14 stores the unique device identifier of the mobile device that audibly heard the identified commercials, and a product and/or brand associated with the identified commercials. (Step 603)

4. The e-commerce shopping app 30 of the mobile device 12 electronically communicates with the remote server 14 when the user of the mobile device 12 launches or uses the shopping app 30 to engage in e-commerce shopping. The electronic communication includes the unique device identifier of the mobile device 12, which again is retrieved from memory of the mobile device 12. (Step 604)

5. In response to the electronic communication from the shopping app 30 of the mobile device 12, the remote server 14 sends to the shopping app 30 of the mobile device 12 the product and/or brand associated with one or more of the identified commercials stored in the database 22 for the same unique device identifier that audibly heard the identified commercials. (Step 505)

6. The shopping app 30 sends the product and/or brand associated with one or more of the identified commercials received from the remote server 14 to the e-shop server 20 of the e-commerce shopping site to formulate and deliver product and/or brand recommendations to be displayed on the mobile device 12 during use of the shopping app 30 by the mobile device user. (Step 606)

The product and/or brand recommendations to be displayed on the mobile device 12 during use of the shopping app 30 by the mobile device user may be for the same product and/or brand of an identified commercial or it may be for a related or different product and/or brand. The recommendations may thus be used for product and/or brand extension purposes (e.g., if the commercial is for product X, show a recommendation of a related product made by the same brand as product X), or for competitive purposes (e.g., if the commercial is for product X, show a recommendation for competitor product Y).

The database 22 of the remote server 14 preferably further stores timestamps of the identified commercials which may be used to send the product and/or brand of only the most recently identified commercials to the shopping app 30 for use by the e-shop server 20 in selecting the recommendations.

The database 22 of the remote server 14 may also store a product type and/or a product category for each identified commercial. The remote server 14 may send to the shopping app 30 the product type and/or product category for the product of the identified commercials. The e-shop server 20 may then use the product type and/or product category for the product of the identified commercials to formulate and deliver the product and/or brand recommendations to be displayed on the mobile device 12 during use of the shopping app 30 by the mobile device user.

In one preferred embodiment, the shopping app 30 is a dedicated mobile app of the type typically downloaded from an app store. In another preferred embodiment, the shopping app 30 is a browser-based application (e.g., Safari®, GOOGLE Chrome®) that has navigated to the e-commerce shopping site within the browser environment, as opposed to a dedicated app environment.

As discussed above, the identified aired or streamed commercials may be commercials aired or streamed for viewing on a television or commercials aired or streamed to be audibly heard on radio.

In one preferred embodiment, the ACR is audio ACR and the audio ACR evaluates a succession of audio samples of commercials identified in the ambient audio content against a database of audio files for commercials (i.e., the library of commercials of the ACR database 34).

Figure 7:
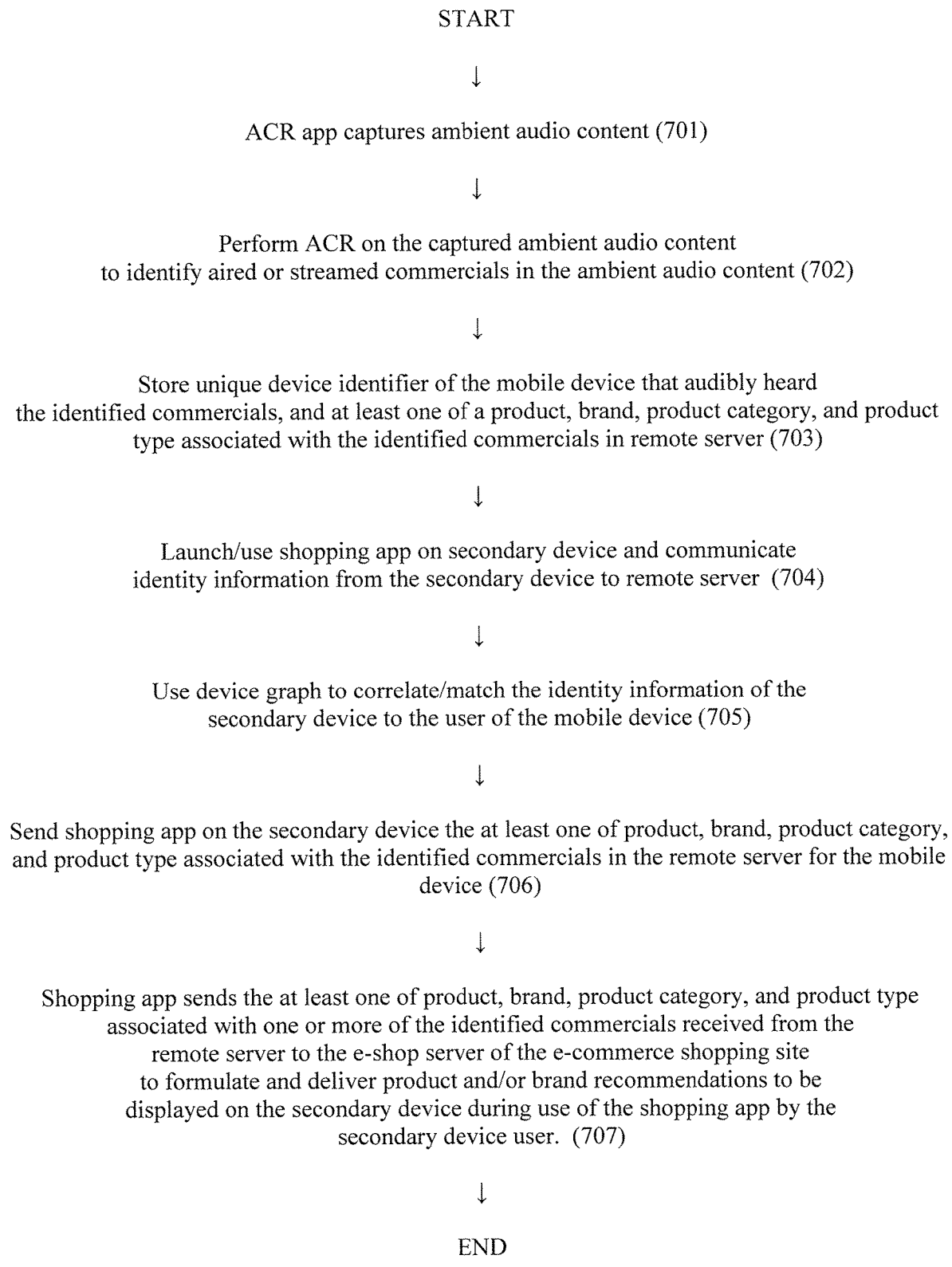
FIG. 7 is a flowchart of the operation of the system of FIG. 5 in accordance with one preferred embodiment of the present invention.

FIG. 7 shows a flowchart of the steps performed by the elements of FIG. 5 in one preferred embodiment wherein the mobile device used for capturing media content is not the same mobile device used for e-commerce shopping. The steps are described in the context of only one mobile device 12' and only one secondary device 52. However, in a functional system, a plurality of mobile devices 12' and secondary devices 52 are concurrently performing these steps.

1. The ACR app 26 in conjunction with the microphone 24 of the mobile device 12' captures ambient audio content, such as from the source of audio 25. The captured ambient audio content includes audio content of media content that is aired or streamed to multiple users. (Step 701)

2. ACR is performed on the captured ambient audio content to identify aired or streamed commercials in the ambient audio content. The ACR app 26 and the remote server 14 communicate with each other to perform the ACR. The communication includes sending the unique ID 28 of the mobile device 12' to the remote server 14. The unique device ID 28 is retrieved from memory of the mobile device 12'. (Step 702)

3. For each identified commercial, the database 22 of the remote server 14 stores the unique device identifier of the mobile device that audibly heard the identified commercials, and a product and/or brand associated with the identified commercials. (Step 703)

4. The e-commerce shopping app 56 of the secondary device 52 electronically communicates with the remote server 14 when the user of the secondary device 52 launches or uses the shopping app 56 to engage in e-commerce shopping. The electronic communication includes identity information provided from the secondary device 52, which may be login credentials of the shopping app 56, the unique device ID 54 of the secondary device 52, or another type of identity information. (Step 704)

5. The remote server 14 uses the device graph 56 to correlate/match the identity information provided from the secondary device 52 to the user of the mobile device 12', thereby allowing the remote server 14 to identify the product and/or brand data in the database 22 that is associated with the mobile device 12'. (Step 705)

6. In response to the electronic communication from the shopping app 56 of the secondary device 52, the remote server 14 sends to the shopping app 56 of the secondary device 52 the product and/or brand associated with one or more of the identified commercials stored in the database 22 for the same unique device identifier that audibly heard the identified commercials (here, the mobile device 12'). (Step 706)

7. The shopping app 56 sends the product and/or brand associated with one or more of the identified commercials received from the remote server 14 to the e-shop server 20 of the e-commerce shopping site to formulate and deliver product and/or brand recommendations to be displayed on the secondary device 52 during use of the shopping app 56 by the secondary device user. (Step 707)

F. Device Graph

As described above with respect to FIG. 5, the device graph 56 includes data for correlating/matching unique device identifiers to other identity information associated with the same entity as the entity of a respective unique device identifier. Data analytics companies maintain "device graphs" which can bridge between device ID's, IP addresses, physical addresses, and the like. Device graphs are described in U.S. Patent Application Publication No. 2015/0370814 (Liodden et al.) assigned to TAPAD, Inc. Device graphs are well-known in the art and thus are not further described in detail herein.

Device graph data particularly suitable for use in the present invention may include login credentials for the e-commerce shopping site. For example, if a user of mobile device 12 launches/uses the shopping app 30, the username (user ID) may be captured in the device graph 56 as being associated with the device ID of the mobile device 12. If the user subsequently logs into the e-shop server 20 using a secondary device 52, the username may be used to match the user to the product and/or brand data of commercials previously captured by a mobile device 12 of the same user, and thereby provide the product and/or brand data to the secondary device 52 for selection of the recommendations.

However, the device graph 56 can perform its function even if the user never logs into the e-commerce shopping site from the shopping app 30 of the mobile device 12. For example, the secondary device 52 and the mobile device 12 may be correlated in the device graph 56 based on previous uses via the same home wifi network. That is, the device graph 56 may store data regarding all device ID's that accessed (logged into) the same home wifi network. While this approach may not be completely accurate as it may not be able to distinguish between devices of different family members in the same home, it is more useful than providing product and/or brand recommendations with no intelligent selection based on who the likely user is. Device graphs may also have built-in intelligence to sort through a plurality of identity information received from the secondary device 52, including both user-entered information (e.g., login credentials) and passively captured data (e.g., device ID, location-based data, IP addresses) to perform a "best match" to the most likely mobile device 12 of the same user so that the product and/or brand information most likely associated with the same user is retrieved from the database 22.

FIG. 8 shows sample data in the device graph 56.

G. System Architecture Variations

In the embodiments of FIGS. 4 and 5, the shopping apps 30 and 56 initially communicate with the remote server 14 to receive the product/brand information, which, in turn, is provided to the e-shop server 20 for selecting the recommendations. However, in alternative embodiments, the shopping apps 30 and 56 may initially communicate with the e-shop server 20, which, in turn, communicates with the remote server 14 to obtain the product/brand information for use in selecting the recommendations. In this manner, the shopping apps 30 and 56 do not need to communicate with the remote server 14. This alternative system architecture performs the same functions in substantially the same manner as the embodiments of FIGS. 4 and 5.

H. Audio ACR for Identifying Commercials in Aired or Streamed Media Content

Search engines that perform this type of recognition are well-known in the art and are incorporated into automated content recognition (ACR) systems. One type of ACR system having such a search engine uses audio fingerprints within video signals to perform the content recognition. One commercially available audio ACR system is made by Audible Magic Corporation, Los Gatos, Calif. Another commercially available audio ACR system is Gracenote Entourage™ commercially available from Gracenote, Inc., Emeryville, Calif. Other ACR systems are disclosed in U.S. Pat. Nos. 2011/0289114 (Yu et al.), 2013/0071090 (Berkowitz et al.), and 2013/0205318 (Sinha et al.), each of which are incorporated by reference herein. Accordingly, the details of an audio ACR process for capturing and identifying commercials in viewed content is not further described.

I. Additional E-Commerce Shopping Sites

FIGS. 4 and 5 show a single e-commerce shopping app. However, the devices may include multiple e-commerce shopping apps, each of which communicate with a completely different e-commerce shopping site. If the shopping app is a browser-based application, then it may navigate to any e-commerce shopping site within the browser environment.

J. Commercial ID and Metadata

Referring to FIG. 3 of U.S. Pat. No. 9,628,836, it is well-known in the art to maintain a library of commercials in an ACR system, wherein each commercial is provided with a unique identifier (commercial ID), one or more fingerprints and metadata. In preferred embodiments of the present invention, the metadata includes one or more of the product, brand, product type, and product category for each commercial. The metadata is created via manual and/or automated processes.

In one preferred embodiment described above, the product and/or the brand of an identified commercial is provided to the e-commerce system elements, namely the e-commerce shopping app and the e-shop server, for use in creating the recommendations, which includes at least one product and/or brand recommendation that may the same or different than the product or brand of the identified commercial.

However, in an alternative embodiment, once the commercial is identified, any of the metadata elements (product, brand, product type, product category) may be provided to the e-commerce system elements for use in creating the recommendations. Thus, if a user has recently viewed a commercial for a Toyota Camry®, the e-commerce system elements may only be provided with metadata indicating that the user has viewed a commercial in the product category of "motor vehicles." The decision regarding which metadata is provided depends upon many factors, such as marketing strategies, programming considerations, and privacy issues. To associate a product or brand with a product type or product category, a database table must be maintained to provide the necessary cross-correlation information between products and brands and product types and product categories (e.g., Toyota Camry belongs to the product category of "motor vehicle," UGG® boots belong to the product type of "shoes," GoPro® belongs to the product type of "electronics.").

The present invention may be implemented with any combination of hardware and software. If implemented as a computer-implemented apparatus, the present invention is implemented using means for performing all of the steps and functions described above.

When implemented in software, the software code for the remote server 14 and the e-shop server 20 can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the remote server 14 and the e-shop server 20 may be embodied in any of a number of forms, such as a rack-mounted computer or a desktop computer.

The databases 22 and 34 may be interconnected with the remote server 14 by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of using mobile devices and a remote server to assist in providing product or brand recommendations for one of a plurality of e-commerce shopping sites viewed on the mobile devices by respective users of the mobile devices, each of the mobile devices including (i) a microphone, (ii) a first application responsive to the microphone and configured to assist in performing automated content recognition (ACR), and (iii) a second application configured to interact with a server of one of the e-commerce shopping sites, each of the mobile devices further including a unique device identifier, the method comprising:

(a) capturing by the first application and the microphone of each mobile device ambient audio content, wherein the captured ambient audio content includes audio content of media content that is aired or streamed to multiple users;

(b) performing ACR on the ambient audio content captured by each of the mobile devices to identify aired or streamed commercials in the ambient audio content, the first application of each mobile device and the remote server communicating with each other to perform the ACR, the communication including sending the unique identifier of each mobile device to the remote server;

(c) storing in a database of the remote server for each identified commercial:
      (i) unique device identifiers of the mobile devices that audibly heard the identified commercials, and
      (ii) at least one of a product, brand, product category, and product type associated with the identified commercials;

(d) the second application of each mobile device electronically communicating with the remote server when the user of the mobile device launches or uses the second application to engage in e-commerce shopping at one of the plurality of e-commerce shopping sites, the electronic communication including the unique device identifier of the mobile device;

(e) in response to the electronic communication from the second application of a mobile device, the remote server sending to the second application of the mobile device at least one of the product, brand, product category, and product type associated with one or more of the identified commercials stored in the database for the same unique device identifier that audibly heard the identified commercials; and (f) the second application sending the at least one of the product, brand, product category, and product type associated with one or more of the identified commercials received from the remote server to the server of one of the e-commerce shopping sites to formulate and deliver at least one of product and brand recommendations to be displayed on the mobile device during use of the second application by the mobile device user, wherein the second application sends the at least one of the product, brand, product category, and product type associated with one or more of the identified commercials received from the remote server to the server of one of the e-commerce shopping sites without any user input by the user of the mobile device regarding identification of the at least one of the product, brand, product category, and product type, and wherein the remote server is a separate entity from the e-commerce shopping sites and the respective servers of the e-commerce shopping sites, and wherein no communication occurs directly between the remote server and the e-commerce shopping sites or the respective servers of the e-commerce shopping sites in performing the steps above.

2. The method of claim 1 wherein the at least one of product and brand recommendations to be displayed on the mobile device during use of the second application by the mobile device user is for the same product, brand, product category, or product type of an identified commercial.

3. The method of claim 1 wherein the at least one of product and brand recommendations to be displayed on the mobile device during use of the second application by the mobile device user is for a different product, brand product category, or product type of an identified commercial.

4. The method of claim 1 wherein the database of the remote server further stores for each identified commercial:

(iii) timestamps of the identified commercials, and wherein the remote server sends to the second application of the mobile device at least one of the product, brand, product category or product type associated with one or more of the most recently identified commercials stored in the database for the same unique device identifier that audibly heard the identified commercials, the most recently identified commercials being selected based on the timestamps.

5. The method of claim 1 wherein the second application is a mobile app.

6. The method of claim 1 wherein the second application is a browser-based application.

7. The method of claim 1 wherein the first application is a mobile app.

8. The method of claim 1 wherein the identified aired or streamed commercials are commercials aired or streamed for viewing on a television.

9. The method of claim 1 wherein the identified aired or streamed commercials are commercials aired or streamed to be audibly heard on radio.

10. The method of claim 1 wherein the ACR is audio ACR and the audio ACR evaluates a succession of audio samples of commercials identified in the ambient audio content against a database of audio files for commercials in a library of commercials.

11. The method of claim 1 wherein:

the database of the remote server stores for each identified commercial at least one of the product and brand associated with the identified commercials, the remote server sends to the second application of the mobile device at least one of the product and brand associated with one or more of the identified commercials stored in the database for the same unique device identifier that audibly heard the identified commercials, and the second application sends the at least one of the product and brand associated with one or more of the identified commercials received from the remote server to the server of one of the e-commerce shopping sites to formulate and deliver the at least one of product and brand recommendations to be displayed on the mobile device during use of the second application by the mobile device user.

12. A method of using mobile devices, secondary devices, and a remote server to assist in providing product or brand recommendations for one of a plurality of e-commerce shopping sites viewed on the secondary devices by respective users of the secondary devices, each of the mobile devices including (i) a microphone, and (ii) an application responsive to the microphone and configured to assist in performing automated content recognition (ACR), each of the secondary devices configured to interact with a server of one of the e-commerce shopping sites, each of the mobile devices further including a unique device identifier, the method comprising:

(a) capturing by the application and the microphone of each mobile device ambient audio content, wherein the captured ambient audio content includes audio content of media content that is aired or streamed to multiple users;

(b) performing ACR on the ambient audio content captured by each of the mobile devices to identify aired or streamed commercials in the ambient audio content, the application of each mobile device and the remote server communicating with each other to perform the ACR, the communication including sending the unique identifier of each mobile device to the remote server;

(c) storing in a database of the remote server for each identified commercial:

(i) unique device identifiers of the mobile devices that audibly heard the identified commercials, and (ii) at least one of a product, brand, product category, and product type associated with the identified commercials, and (iii) device graph data that correlates the unique device identifiers to other identity information associated with the same entity as the entity of a respective unique device identifier, and (d) the secondary devices electronically communicating with the remote server to engage in e-commerce shopping at one of the plurality of e-commerce shopping sites, the electronic communication including the other identity information;

(e) in response to the electronic communication from the secondary device, the remote server sending to the secondary device at least one of the product, brand, product category, and product type associated with one or more of the identified commercials stored in the database for the same unique device identifier that audibly heard the identified commercials, the remote server using the device graph data to match the other identity information to the appropriate unique device identifier; and (f) the secondary device sending the at least one of the product, brand, product category, and product type associated with one or more of the identified commercials received from the remote server to the server of one of the e-commerce shopping sites to formulate and deliver at least one of product and brand recommendations to be displayed on the secondary device during use of the secondary device when interacting with the server of the e-commerce shopping site, wherein the secondary device sends the at least one of the product, brand, product category, and product type associated with one or more of the identified commercials received from the remote server to the server of one of the e-commerce shopping sites, and wherein the remote server is a separate entity from the e-commerce shopping sites and the respective servers of the e-commerce shopping sites, and wherein no communication occurs directly between the remote server and the e-commerce shopping sites or the respective servers of the e-commerce shopping sites in performing the steps above.

13. The method of claim 12 wherein the secondary device includes a second application configured to interact with a server of one of the e-commerce sites, and wherein the second application of the secondary device electronically communicates with the remote server when the user of the secondary device launches or uses the second application to engage in e-commerce shopping, and wherein the server of one of the e-commerce shopping sites uses the at least one of the product, brand, product category, and product type associated with one or more of the identified commercials sent to the second application of the secondary device to formulate and deliver at least one of product and brand recommendations to be displayed on the secondary device during use of the second application by the secondary device.

14. The method of claim 13 wherein the second application is a mobile app.

15. The method of claim 13 wherein the second application is a browser-based application.

16. The method of claim 12 wherein the at least one of product and brand recommendations to be displayed on the secondary device during use of the secondary device is for the same product, brand, product category, or product type of an identified commercial.

17. The method of claim 12 wherein the at least one of product and brand recommendations to be displayed on the secondary device during use of the secondary device is for a different product, brand, product category, or product type of an identified commercial.

18. The method of claim 12 wherein the database of the remote server further stores for each identified commercial:

(iv) timestamps of the identified commercials, and wherein the remote server sends to the secondary device at least one of the product, brand, product category, and product type associated with one or more of the most recently identified commercials stored in the database for the same unique device identifier that audibly heard the identified commercials, the most recently identified commercials being selected based on the timestamps.

19. The method of claim 12 wherein the first application is a mobile app.

20. The method of claim 12 wherein the identified aired or streamed commercials are commercials aired or streamed for viewing on a television.

21. The method of claim 12 wherein the identified aired or streamed commercials are commercials aired or streamed to be audibly heard on radio.

22. The method of claim 12 wherein the ACR is audio ACR and the audio ACR evaluates a succession of audio samples of commercials identified in the ambient audio content against a database of audio files for commercials in a library of commercials.

23. The method of claim 12 wherein the secondary device is a second mobile device that is different from the mobile device that captures the ambient audio content, the second mobile device being correlated with the mobile device that captures the ambient audio content via the device graph data.

24. The method of claim 12 wherein the other identity information of at least some of the secondary devices includes login credentials for the e-commerce shopping site, and wherein the device graph data includes the login credentials.

25. The method of claim 12 wherein:

the database of the remote server stores for each identified commercial at least one of a product and brand associated with the identified commercials, the remote server sends to the secondary device at least one of the product and brand associated with one or more of the identified commercials stored in the database for the same unique device identifier that audibly heard the identified commercials, and the secondary device sends the at least one of the product and brand associated with one or more of the identified commercials received from the remote server to the server of one of the e-commerce shopping sites to formulate and deliver at least one of product and brand recommendations to be displayed on the secondary device during use of the secondary device when interacting with the server of the e-commerce shopping site.

* * * * *